Jan. 6, 1942.  G. RAYMOND ET AL  2,268,961
VESSEL FOR CONTAINING HIGH PRESSURE FLUIDS
Original Filed Dec. 5, 1938  2 Sheets-Sheet 1
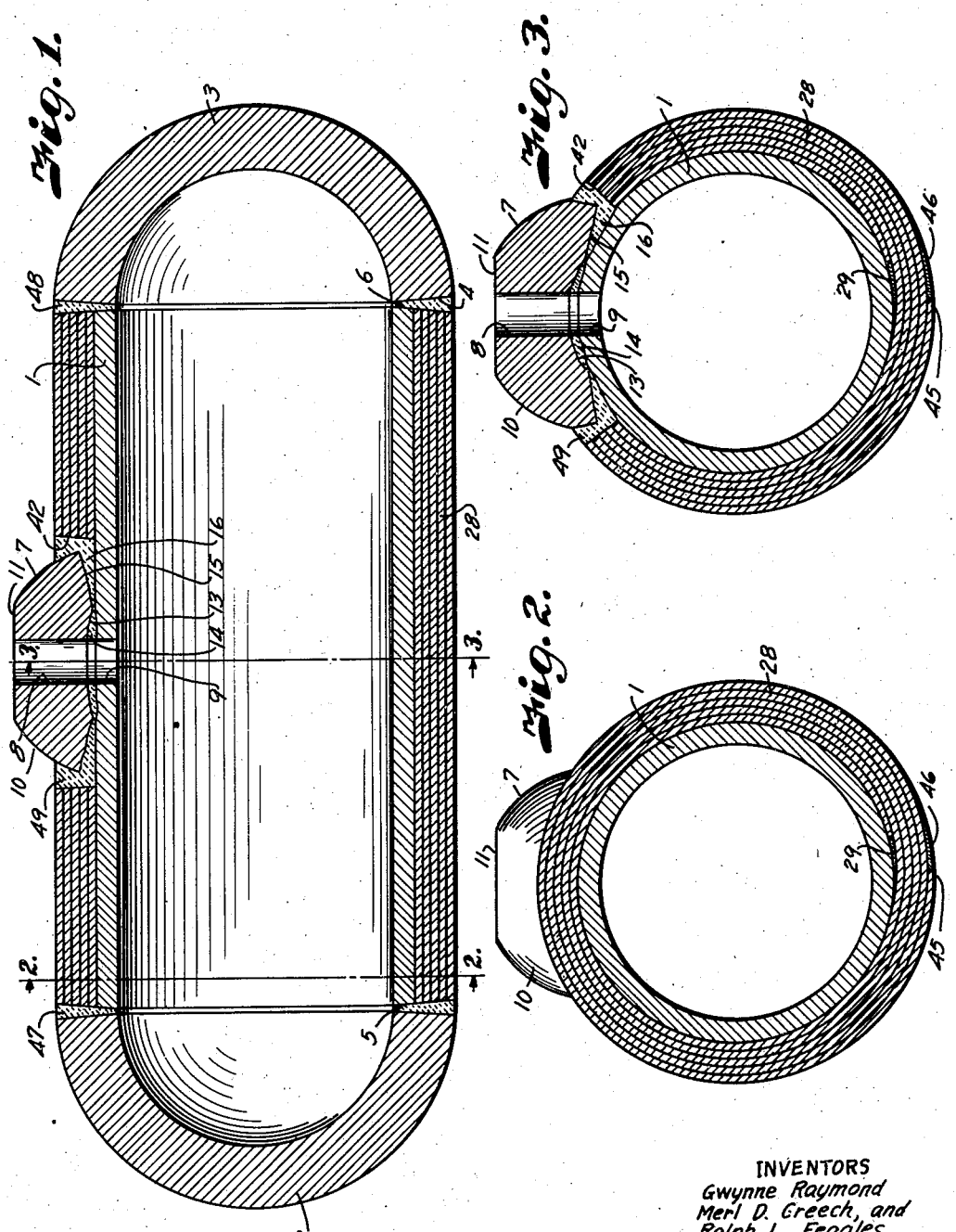
INVENTORS
Gwynne Raymond
Merl D. Creech, and
Ralph L. Feagles.
BY
Arthur C. Brown
ATTORNEY

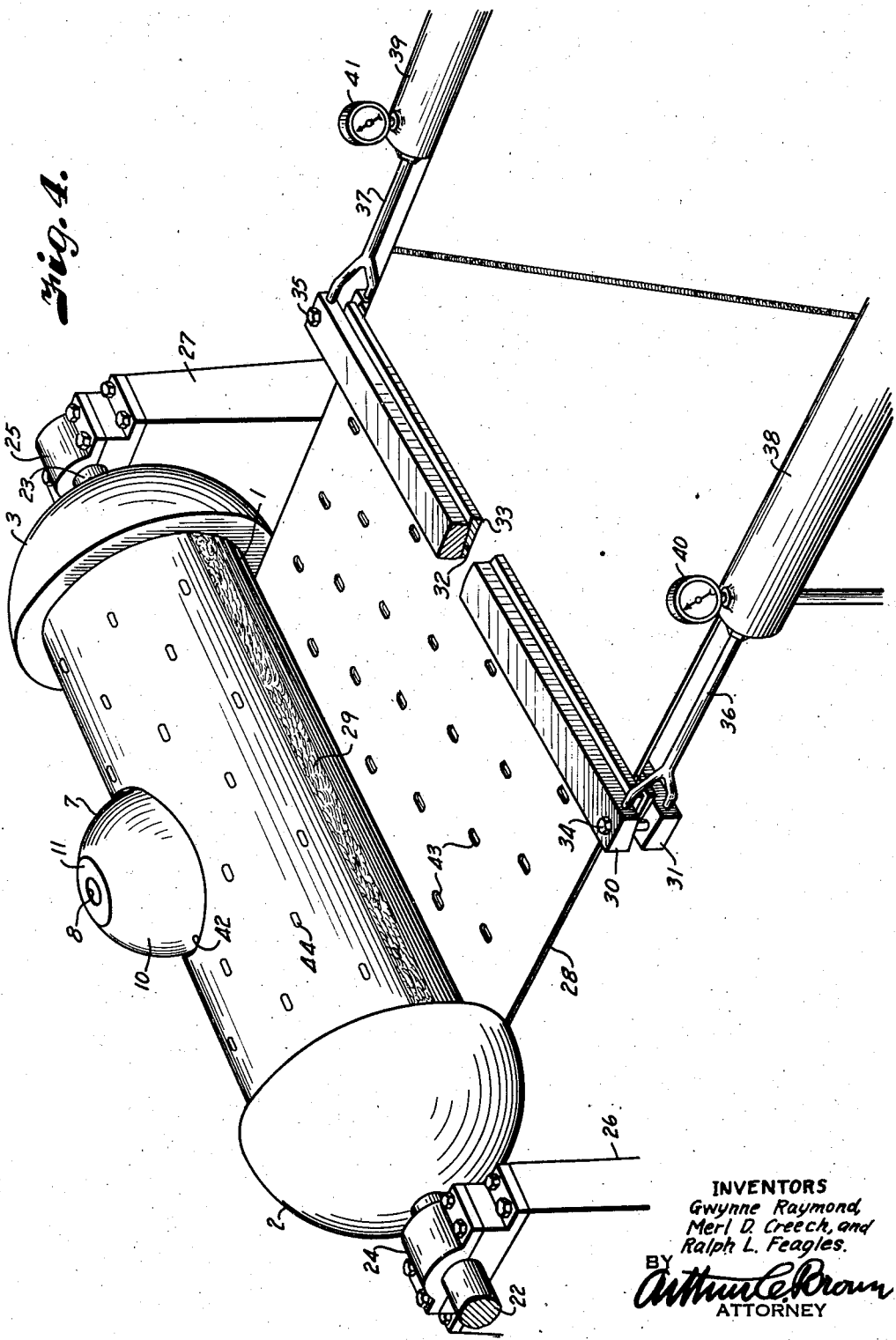

Patented Jan. 6, 1942

2,268,961

UNITED STATES PATENT OFFICE 2,268,961

VESSEL FOR CONTAINING HIGH PRESSURE FLUIDS

Gwynne Raymond, Merl D. Creech, and Ralph L. Feagles, Oklahoma City, Okla.

Original application December 5, 1938, Serial No. 244,076. Divided and this application March 10, 1939, Serial No. 261,000

5 Claims. (Cl. 220—3)

This invention relates to vessels particularly those capable of withstanding extremely high working pressures and temperatures, the present application being a division of application Serial Number 244,076, filed December 5, 1938.

Industry of today requires vessels which are adapted to safely contain high pressures and temperatures. In fact many high pressure processes require use of vessels in such size that the walls must be as much as six to eight inches in thickness. The manufacture of such vessels is difficult and the cost is extremely expensive. Vessels fabricated of forged and heat treated plates of the required thickness have uncontrolled internal stresses which seriously weaken the structure and make it difficult to calculate safe working pressures to which the vessel may be subjected. To solve these problems laminated vessels have been produced but they have proven little better than vessels having solid walls.

It is, therefore, the principal purpose of the present invention to provide a laminated vessel construction wherein the internal stresses of the respective laminations are controlled and distributed so that each layer takes its part of the working pressure when the vessel is placed in operation.

Other objects of the invention are to provide a laminated vessel having high strength weight ratio for safely containing a given pressure; and to provide a vessel construction wherein the laminations are securely anchored to the heads of the vessels.

In accomplishing these and other objects of the invention, as hereinafter pointed out, we have provided improved details of structure, the preferred form of which is illustrated in the accompanying drawings, wherein:

Fig. 1 is a longitudinal section through a vessel constructed in accordance with the present invention.

Fig. 2 is a cross-section through the vessel on the line 2—2 of Fig. 1.

Fig. 3 is a similar section on the line 3—3 of Fig. 1.

Fig. 4 is a perspective view of the inner shell or foundation of the vessel having the heads welded thereto and showing the formation of the wall wherein predetermined degrees of tension are produced in the respective layers.

Referring more in detail to the drawings:

In carrying out our invention, we have discovered that when pressure is applied within the interior of a thick walled vessel tending to enlarge the inner diameter thereof, the outer diameter is not increased perceptibly. This is accounted for in the fact that the inner portion of the wall has compressed and the outer portion of the wall is placed in tension, with the result that the internal stresses seriously weaken the vessel and it is not capable of safely retaining the working pressures for which the wall thickness was designed. This action takes place in a tank having a laminated wall structure with the result that the stresses imparted in the various layers do not adequately perform their part in withstanding high internal pressures. We therefore find it highly advantageous in constructing a laminated vessel to establish predetermined stresses in the wall structure by varying tension imparted to the respective layers so that the tension is controlled and varied according to the stresses which the respective layers must withstand.

When the circumferential wall of a cylindrical vessel is formed merely by winding one convolution on another and the heads welded thereto, it is difficult to prevent leaks, and when a leak does occur in such a vessel the pressure creeps out between the laminations so that its origin cannot be determined from the outside of the vessel. In overcoming this difficulty, we have adopted the principle of the automobile tire, wherein the inner tube prevents leaks and the outer casing gives the required strength. The vessel, therefore, comprises an inner shell 1 formed by rolling a sheet of metal of desired thickness to withstand testing pressures taking in consideration the inner diameter of the tank. The material, however, is sufficiently thin to permit ready fabrication in cylindrical form. Preferably solid metal heads 2 and 3 of desired thickness are welded to the ends of the cylindrical shell.

In the illustrated instance the heads 2 and 3 are substantially hemispherical in form and have their inner radius corresponding to the inner radius of the shell and the outer radius corresponding to the outer radius of the finished vessel as shown in Fig. 1. The abutting surfaces 4 thereof project circumferentially of the outer surface of the shell and are tapered from the plane of the centers of curvature to facilitate welding as later described. The heads 2 and 3 are placed concentrically of the axis of the shell and welded as indicated at 5 and 6.

When the shell is to be provided with a fitting 7, it should be of proper thickness to withstand internal pressures of the finished vessel. In the illustrated instance the fitting is in the form of a ring having a central opening 8 registering with a corresponding opening 9 in the shell. The outer periphery of the fitting is rounded on suitable curves, as at 10, and the terminal thereof flattened, as at 11 and the central inner face is fitted to the shell and is countersunk as at 13 to receive welding 14 by which the fitting is attached to the shell. The portion of the fitting encircling the weld 14 is preferably tapered, as at 15, to form an annular space to receive a welding material 16 that supplements the inner weld 14. The shell may then be tested for leaks in any suitable manner to assure that the welds and walls are leak-proof.

After testing, suitable trunnions 22 and 23 are temporarily welded or otherwise attached to the heads 2 and 3 in the axis thereof as shown in Fig. 4, so that the shell is rotatably supportable in bearings 24 and 25 carried on suitable supports 26 and 27. One of the trunnions, for example 22, is of sufficient length to be connected with any suitable power for effecting rotation of the shell. A metal ribbon 28 is then prepared, having a width corresponding to the spacing between the heads 2 and 3, and of sufficient length to provide the necessary number of convolutions to produce a tank of predetermined wall thickness. One end of the ribbon is then skived and welded to the tank by a transverse weld 29 as shown in Fig. 4. The ribbon is then placed in a gripping device, such as clamping bars 30—31 having angle shaped inner faces 32 corresponding with wedge plates 33 directly engaging the upper and lower surfaces of the ribbon. The wedge plates are drawn into clamping engagement with the ribbon by draw bolts 34 and 35, inserted through the ends of the clamping bars 30—31. The thicker portions of the wedges are arranged so that when pulling pressure is applied to the bars in a direction away from the welded end of the ribbon, this pressure acts to enhance gripping action of the wedges thereby preventing slippage between the bars and ribbon.

The ends of the bars are suitably connected through rods 36 and 37 with hydraulic devices 38 and 39 whereby variable tensions may be applied to the ribbon through control of fluid pressure medium used in the respective devices, the pressures being indicated by gauges 40 and 41. While tension is being maintained on the ribbon with the hydraulic devices, the shell is rotated to wind the ribbon about the shell. On each revolution an opening 42 is cut in the ribbon so that the fitting will pass therethrough, permitting the convolutions to closely engage each other whereby frictional contact of one convolution on the other prevents unwinding thereof and maintains the predetermined tension imparted therein. If desired the ribbon may be provided with welding apertures 43 whereby one convolution is tacked to the other as indicated at 44. Attention is drawn to the fact that a longitudinal tension placed on the ribbon also exerts a corresponding tension transversely thereof.

A sufficient number of convolutions is wound on the shell so that the peripheral face of the final convolution registers with the peripheral edges of the heads. During the winding it may be necessary to readjust the bars 30—31 when the hydraulic devices have come to the end of their stroke. While readjustment is made tension is maintained on the ribbon by a similar mechanism, adjustable weights, or the like. When the winding is completed the free edge of the ribbon may be skived, as indicated at 45, and welded to the underlying convolution by welding 46.

In order to provide a welding space between the ends of the convolutions and the heads 2 and 3, the side edges of the ribbon are preferably preshaped so that when wound on the shell they will lie on an angle corresponding to the angle of the head faces to form a welding space in which a welding material is deposited as indicated at 47 and 48. Welding material is also filled around the fitting as indicated at 49. The trunnions are then removed from their supporting bars and cut from the ends of the heads, completing a tank assembly.

In tanks requiring longer ribbons than the length of sheets obtainable, the ribbons may be formed of a series of sheets having the ends cut on a bias and welded together as shown in Fig. 4, so that the gripping action of the next upper and lower convolutions supplements strength of the weld.

In extremely long tanks two or more ribbons may be wound on the shell and welded together in the same manner as above described.

In order to give a better understanding of the variable or differential tension applied in the respective convolutions to produce a vessel having maximum strength, the following is a calculation for a vessel having a ¾-inch shell rolled to 14 inches inside diameter, then wound with a ⅛-inch plate to bring the final outside diameter to 17½ inches, giving a total wall thickness of 1¾ inches, a working pressure within the tank assumed to be 3,000 pounds per square inch.

The A. S. M. E. code gives the following as the stress in the above vessel:

$$\text{Stress} = 15.75 \times 3000/2 \times 1.75 = 13,500 \text{ lb./sq. in.}$$

The stress in the above vessel using the more exact equation derived and applicable to shells relatively thick compared to the diameter ("Strength of Materials" Case, Longmans, chap. XXVIII) where $r_1$ = inner radius of vessel.
$r_2$ = outer radius of vessel.
$r$ = radius at point where stress is to be found.
$p$ = internal pressure.
$s$ = stress caused by this pressure.

$$S = \frac{pr_1^2}{r_2^2 - r_1^2} \frac{r_2^2 + r^2}{r^2}$$

Substituting in the above formula we get stress at inner radius where $r = r_1$ $$S = \frac{3000 \times 49}{76.5 - 49} \frac{76.5 + 49}{49} = 13,680 \text{ lbs./in.}^2$$

Stress at outer radius where $r = r_2$ $$S = \frac{3000 \times 49}{76.5 - 49} \frac{76.5 + 76.5}{76.5} = 10,700 \text{ lbs./in.}^2$$

From the foregoing calculations it is seen that the stress is not distributed uniformly throughout the thickness of the shell but is greatest at the inner surface. The difference between the inner and outer fibre stress will become more and more as the thickness of the shell is increased with respect to the diameter.

By varying the tension in the laminations any desired stress distribution may be obtained. Thus, by suitably varying the tension in the laminations, unequal distribution of stresses is overcome.

Tensions and compressions in the different layers as they are wound on the vessel:

| 6/8 | 7/8 | 8/8 | 9/8 | 10/8 | 11/8 | 12/8 | 13/8 | 14/8 |
|---|---|---|---|---|---|---|---|---|
| −600 | 600 |  |  |  |  |  |  |  |
| −1,115 | 515 | 600 |  |  |  |  |  |  |
| −1,491 | 453 | 538 | 500 |  |  |  |  |  |
| −1,702 | 420 | 505 | 467 | 400 |  |  |  |  |
| −1,942 | 380 | 465 | 427 | 360 | 400 |  |  |  |
| −2,163 | 344 | 421 | 391 | 324 | 364 | 400 |  |  |
| −2,304 | 311 | 388 | 358 | 291 | 331 | 367 | 400 |  |
| −2,443 | 288 | 365 | 335 | 268 | 303 | 344 | 377 | 300 |

The stresses due to the above tensions and to the internal pressure will be as follows:

| Radius | Internal stress | Stress due to pressure | Total stress |
|---|---|---|---|
| 7.000 | −3,257 | 13,700 | 10,400 |
| 7.750 |  |  |  |
| 7.875 | 2,300 | 12,100 | 14,400 |
| 8.000 | 2,920 | 11,700 | 14,600 |
| 8.125 | 2,680 | 11,500 | 14,200 |
| 8.250 | 2,150 | 11,400 | 13,600 |
| 8.375 | 2,464 | 11,200 | 13,600 |
| 8.500 | 2,750 | 11,000 | 13,700 |
| 8.625 | 3,200 | 10,700 | 13,900 |
| 8.750 | 2,400 | 10,600 | 13,000 |

In the above tabulation, the total stress is the algebraic sum of the initial stress and the stress due to the internal pressure.

The above calculations for a specific tank are merely illustrative of the variable stresses imparted in the respective layers, and these stresses may be varied therefrom to provide a tank suitable for any given service.

From the foregoing it is apparent that we have provided a laminated tank wherein the respective convolutions are maintained under a predetermined initial stress in both circumferential and axial directions with respect to the tank calculated to give maximum strength and to safely withstand the working pressures for which a tank is designed.

What we claim and desire to secure by Letters Patent is:

1. A laminated vessel subject to internal pressure including, an inner relatively thin walled tubular shell, and a plurality of sheet metal layers encircling the shell, one continuous with the otherh and each having a predetermined hoop tension establishing predetermined tensile stresses and with the side edges thereof fixed to ends of the shell for enhancing the resistance of the vessel to bursting pressures in both circumferential and longitudinal directions.

2. A laminated vessel subject to internal pressure including, a relatively thin walled tubular shell and a plurality of sheet metal layers encircling the shell, one continuous with the other, each having a predetermined hoop tension establishing tensile stresses of substantially the same magnitude under pressure within the vessel with the side edges thereof fixed to ends of the shell for enhancing the normal resistance of said sheet metal layers to bursting pressures in both circumferential and longitudinal directions.

3. A laminated vessel subject to internal pressure including, a relatively thin walled tubular shell, heads secured to the ends of the shell and naving an inner radius approximately corresponding to the inner radius of the shell and of a thickness so that the outer radius is greater than the outer radius of the shell to provide one side of a welding groove, a plurality of sheet metal layers encircling the shell, one continuous with the other to substantially the depth of the welding groove to form the other side of the welding groove, and welding material filling the welding grooves and connecting adjacent edges of the layers with said heads, said metal layers having prefixed hoop tension resisting forces between said heads in the axial direction of said vessel and for effecting circumferential tensile stresses of predetermined magnitude circumferentially of said vessel under pressure contained in the interior of the vessel.

4. A laminated vessel subject to internal pressure including, a relatively thin walled tubular shell, heads secured to the ends of the shell and having an inner radius approximately corresponding to the inner radius of the shell and of a thickness so that the outer radius is greater than the outer radius of the shell to provide one side of a welding groove, a plurality of sheet metal layers encircling the shell, one continuous with the other to substantially the depth of the welding groove, and welding material filling the welding grooves and connecting adjacent edges of the layers with said heads, said layers having prefixed hoop tension resisting forces between said heads in both axial and circumferential directions and for effecting circumferential stresses of predetermined magnitude under internal pressure contained in the vessel.

5. A laminated vessel subject to internal pressure including, a relatively thin walled tubular shell, heads secured to the ends of the shell and having an inner radius approximately corresponding to the inner radius of the shell and of a thickness so that the outer radius is greater than the outer radius of the shell to provide one side of a welding groove, a plurality of sheet metal layers encircling the shell, one continuous with the other to substantially the depth of the welding groove, and welding material filling the welding groove and connecting adjacent edges of the layers with said heads, said layers having prefixed hoop tension resisting forces between said heads in both axial and circumferential directions of the vessel under internal pressures contained in said vessel, said hoop tension having been imparted by varying the tension from a maximum in the inner layers to a minimum in the outer layers for effecting circumferential tensile stresses of substantially the same magnitude in said layers under pressure contained in said vessel.

GWYNNE RAYMOND.
MERL D. CREECH.
RALPH L. FEAGLES.